(No Model.)

C. E. BALL.
DYNAMO ELECTRIC MACHINE.

No. 285,549. Patented Sept. 25, 1883.

Witnesses:
Wm. H. Powell.
A. A. Connolly.

Inventor:
Charles E. Ball
By Connolly Bros,
Attorneys.

UNITED STATES PATENT OFFICE.

CHARLES E. BALL, OF PHILADELPHIA, PENNSYLVANIA.

DYNAMO-ELECTRIC MACHINE.

SPECIFICATION forming part of Letters Patent No. 285,549, dated September 25, 1883.

Application filed May 15, 1883. (No model.)

*To all whom it may concern:*

Be it known that I, CHARLES E. BALL, a citizen of the United States, residing at Philadelphia, in the county of Philadelphia and State of Pennsylvania, have invented certain new and useful Improvements in Dynamo-Electric Machines; and I do hereby declare the following to be a full, clear, and exact description of the invention, reference being had to the accompanying drawings, which form part of this specification, in which—

Figure 1:
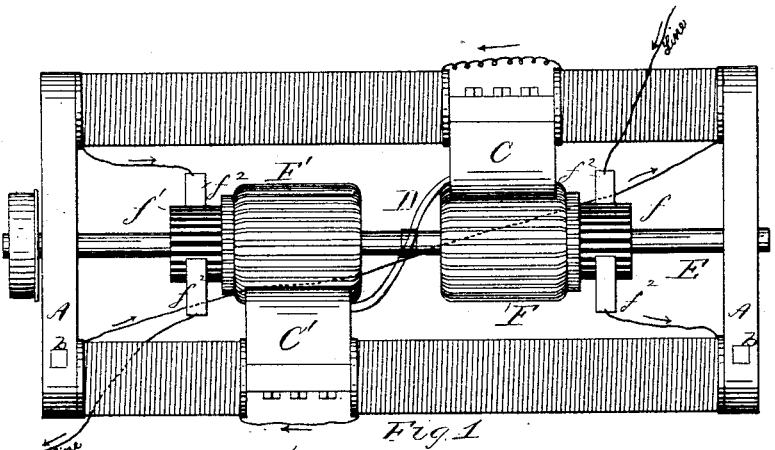
Figure 2:
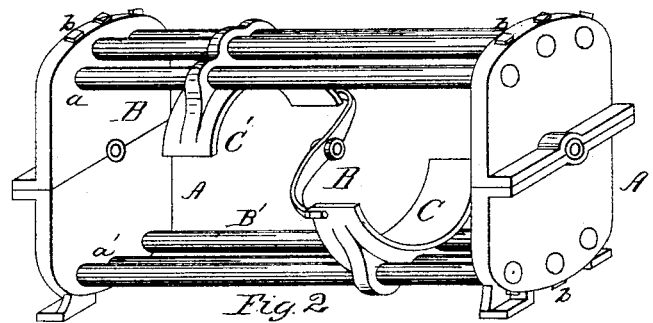

Figure 1 shows a side view of my improved dynamo-electric machine; Fig. 2, a view of same with armatures removed. Figs. 3, 4, 5, and 6 show different methods of connecting the circuits.

My invention relates to dynamo-electric machines in which two armatures are employed, each located and adapted to be rotated in the inductive field of only one pole of a magnet; and my improvements have reference to certain details of construction and combination, hereinafter fully set forth, whereby the expense of manufacture is lessened and the efficiency of the machine is increased.

Said improvements consist in the combination, in the machine, of two armatures on one shaft, each of said armatures being in opposition to only one pole of the field, said poles being of unlike sign, and each of said armatures having its own commutator.

Referring to the accompanying drawings, A A' indicate the ends or heads of the machine, which are iron, and preferably castings, having mortises $a\ a'$ for the reception of the field-magnet bars B B', whose ends pass through said mortises and are retained or secured by set-screws $b\ b'$.

C C' are the pole-pieces, which are on opposite sides of the machine.

D is a brace or stay, of brass or other diamagnetic material, extending between the pole-pieces C C', and forming a central bearing or support for the armature-shaft E, which has end bearings in the heads A A'.

Figure 3:
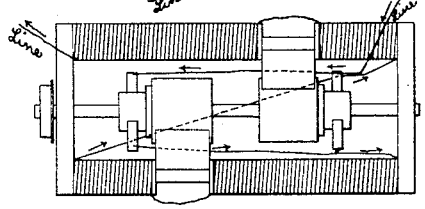
Figure 4:
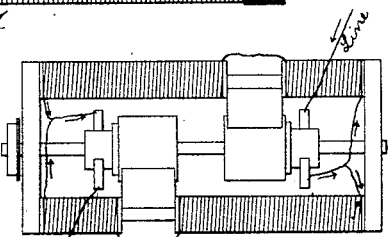
Figure 5:
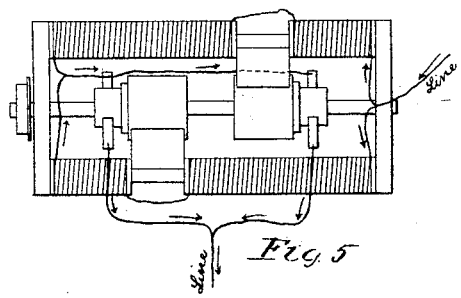
Figure 6:
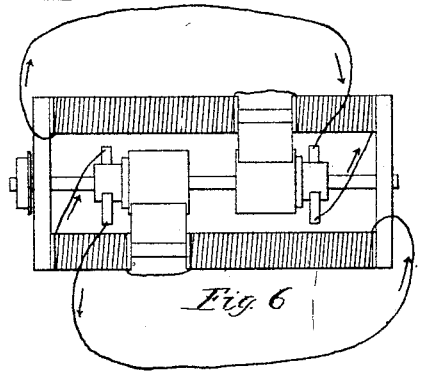

F F' are the armatures, which are preferably of the ring type, but which, if desired, may be of any other known or suitable style of construction. Each armature has its own commutator $f\ f'$, respectively, with brushes $f^2\ f^2$, as shown. One of the armatures is opposed to the pole C, so as to rotate within the inductive field thereof, while the other in like manner is opposed to the pole C'. These poles are unlike, and their dissimilarity of sign may be secured by various modifications of windings and circuits, so that my invention is not confined to any specific arrangement for producing unlike poles. Such modifications are shown in the different figures of the drawings, as follows:

In Fig. 1 the armatures and field-magnets are connected in series. In Fig. 3 the armatures are in parallel circuit and the field-magnets in series. In Fig. 4 the armatures are in series and field-magnets in parallel circuit. In Fig. 5 both the armatures and the field-magnets are in parallel circuit. In Fig. 6 there are two independent circuits, each embracing one armature and one field-magnet in series. The two armatures can also be connected in parallel circuits, or in series having an external circuit independent of the field, and the magnets of the latter may be connected in either series or in parallel circuit and be charged by a separate electric generator or exciter. Other combinations may, if desired, be made by changing the circuits of the armatures and field.

What I claim as my invention is as follows:

1. In combination with the pole-pieces C C' on opposite sides of the machine, the brace or stay D, forming a central bearing for the armature-shaft, substantially as shown and described.

2. The combination, in a dynamo-electric machine, of two armatures on one shaft, each connected with its own commutator, and located and arranged to be rotated within the inductive field of only one pole of an electro-magnet, the two poles being on opposite sides, substantially as set forth.

3. The combination, in a dynamo-electric machine, of an electro-magnet having unlike poles on opposite sides—*i. e.*, one pole on each side—with two armatures on a single shaft, each of said armatures having a commutator, and being arranged and adapted to be rotated in the inductive field of only one of said poles, substantially as shown and described.

In testimony that I claim the foregoing I have hereunto set my hand this 9th day of May, 1883.

CHAS. E. BALL.

Witnesses:
WM. H. POWELL,
ISAIAH MATLACK.